(12) United States Patent
Hagiwara

(10) Patent No.: US 6,483,796 B1
(45) Date of Patent: Nov. 19, 2002

(54) RECORDING MEDIUM, INFORMATION REPRODUCING APPARATUS, INFORMATION RECORDING APPARATUS, AND INFORMATION RECORDING AND REPRODUCING APPARATUS

(75) Inventor: Yoshiaki Hagiwara, Kanagawa (JP)

(73) Assignee: Sony Corporation (JP)

( * ) Notice: Subject to any disclaimer, the term of this patent is extended or adjusted under 35 U.S.C. 154(b) by 36 days.

(21) Appl. No.: 09/704,560

(22) Filed: Nov. 3, 2000

Related U.S. Application Data

(62) Division of application No. 09/000,353, filed on Jul. 14, 1998, now Pat. No. 6,157,610.

(30) Foreign Application Priority Data

Jul. 19, 1995 (JP) .............................................. 7-183057
Dec. 1, 1995 (JP) .............................................. 7-314292

(51) Int. Cl.$^7$ ................................................ G11B 7/00
(52) U.S. Cl. ....................................... 369/101; 369/121
(58) Field of Search ............................. 369/275.2, 100, 369/101, 121, 120, 126, 272, 275.1, 288

(56) References Cited

U.S. PATENT DOCUMENTS

| 3,226,696 A | 12/1965 | Dove |
| 3,981,025 A | 9/1976 | Schoettle et al. |
| 4,038,663 A | 7/1977 | Day et al. |
| 4,148,067 A | 4/1979 | Holt |
| 4,888,758 A | * 12/1989 | Scruggs et al. .......... 369/275.2 |

FOREIGN PATENT DOCUMENTS

| DE | 30 13 099 A1 | 10/1981 |
| DE | 35 39 196 A1 | 5/1986 |
| JP | P59-112451 | 6/1984 |
| JP | 60 120097 A | 6/1985 |
| JP | P63-119042 | 11/1986 |
| JP | P01-235048 | 9/1989 |
| JP | P05-36128 | 2/1993 |
| JP | P05-325276 | 12/1993 |

* cited by examiner

Primary Examiner—Paul W. Huber
(74) Attorney, Agent, or Firm—Rader, Fishman & Grauer PLLC; Ronald P. Kananen

(57) ABSTRACT

An information reproducing apparatus emits an electron beam E from an electron gun 40 to a signal layer 12 of a disk 1, detects a change of the incident intensity of the reflection thereof via a detector 42, and reproduces the information of the disk 1 by a reproducing circuit 5. A recording medium 20 has a conductive layer 22, an insulating layer 23, and island-like fixed electrodes 24 thereon electrically insulated from the periphery with a memory function imparted to the fixed electrodes. For the writing, electrons are injected into the fixed electrodes by the electron gun. For full erasure, a voltage is applied to the conductive layer 22. For the reading, the electrostatic effect of the counter electrodes and the fixed electrodes is utilized. This enables an increase of the volume of information and an enhancement of precision of the reading of the information.

1 Claim, 14 Drawing Sheets

RECORDING MEDIUM, INFORMATION REPRODUCING APPARATUS, INFORMATION RECORDING APPARATUS, AND INFORMATION RECORDING AND REPRODUCING APPARATUS

This application is a divisional of U.S. application Ser. No. 09/000,353, field Jul. 14, 1998, now U.S. Pat. No. 6,157,610.

TECHNICAL FIELD

The present invention relates to a recording medium recording digital information thereon, a recording medium functioning as a nonvolatile memory, an information reproducing apparatus, an information recording apparatus, and an information recording and reproducing apparatus using the same.

BACKGROUND ART

Conventionally, as a ROM (read only memory) recording medium of digital information and an information reproducing apparatus thereof, there are a CD (compact disk) and a player of the same.

FIG. 28 is a block diagram schematically showing that apparatus.

In FIG. 28, reference numeral 100 is a CD and reference numeral 200 is a player.

In the CD 100, pits 102 are formed as digital information in a signal layer 101. A protective layer 103 and a transparent plastic substrate 104 are adhered to an upper surface and a lower surface of this signal layer 101.

In such a CD 100, the track pitch is set to 1.6 µm and the shortest pit length is set to 0.9 µm.

The player 200 is an apparatus which detects the existence of the pits 102 to reproduce the information of the CD 100 and is provided with an optical pick-up 201, an RF amplifier 202, a digital signal processing circuit 203, etc.

Namely, a laser beam L having a wavelength of 780 nm is fired from a laser diode 210 of the optical pick-up 201 to the CD 100 side. The reflected laser beam L is detected at the photodiode 211. The RF signal is amplified by the RF amplifier 202, then subjected to digital processing etc. at the digital signal processing circuit 203 to reproduce the information of the CD 100.

The CD 100 and the player 200 thereof described above, however, are structured to use a laser beam L to optically detect the pits 102 of the CD 100, therefore there is a limit to the wavelength of that beam and the precision of detection is low. For this reason, the size of the pits 102 cannot be made small and a large amount of information cannot be recorded on the CD 100. For example, in a CD 100 having a diameter of 12 cm, the recordable amount of digital information is about 650 megabytes.

Further, as other recording media and the information reproducing apparatuses thereof, there are the recently much talked about DVD (digital video disk) and the players thereof.

In this apparatus, the track pitch of the DVD is set to 0.84 µm and the shortest pit length is set to 0.451 µm, so the existence of the pits can be detected by a laser beam having a wavelength of 635 nm or less. Accordingly, a higher density and larger amount of information can be recorded on a DVD in comparison with the CD 100. Nevertheless, the amount of digital information which can be recorded on a DVD of a diameter of 12 cm is about 3.9 gigabytes.

Contrary to this, when the information of the CD and DVD is detected by using a laser beam having a blue wavelength, the precision of detection is improved. However, since the pits are detected by using light, there is a limit and thus only information of a magnitude of 0.45 µm to 0.3 µm at the lowest can be detected.

Accordingly, the conventional recording media such as CDs and DVDs and the information reproducing apparatuses using the same were insufficient as multimedia apparatuses, for which recording and reproduction of a large amount of information such as moving picture information and audio information were required.

On the other hand, as a recording medium which can be recorded on and reproduced from like a nonvolatile memory of a semiconductor and an information recording and reproducing apparatus thereof, there are a so-called "Mini Disc" and a player thereof.

The "Mini Disc" recording medium is a magneto-optic disk 300 as shown in FIG. 29 and is structured with a magnetic layer 302 formed on a polycarbonate substrate 301 in a corrugated manner and with a protective layer 303 provided on the magnetic layer 302.

When recording, the laser beam strikes the recording medium and heats the same while an external magnetic field is applied, the magnetization is inverted and information of "1" or "0" is recorded according to the orientation of the domain. Then, when reproducing, using the fact that the plane of polarization of the reflected light of the laser beam slightly rotates in a forward or reverse direction corresponding to the orientation of the magnetization of the magnetic layer (Kerr effect), the laser is irradiated, a laser beam is fired to read the orientation of the magnetization.

In the "Mini Disc" as well, however, since light is used for the sensing medium, it is not possible to exceed the limit of the wavelength of light. As shown in FIG. 29, the pitch of the recording width is 1.1 µm+0.5 µm, i.e., about 1.6 µm.

The present invention was made so as to solve the above problem and has as an object thereof to provide a ROM recording medium and a recording medium functioning as a nonvolatile memory enabling an increase of the capacity of the information and an improvement of the precision of the reading of the information and an information reproducing apparatus, an information recording apparatus, and an information recording and reproducing apparatus using the same.

DISCLOSURE OF THE INVENTION

According to the present invention, to achieve the above object, as a first aspect of the invention, the recording medium disclosed in claim 1 is configured provided with a substrate, a signal layer made of a metal which is fixed to the surface of the substrate, and pits formed in the same.

The recording medium disclosed in claim 1 is structured as the invention disclosed in claim 2 provided with a protective plate which covers the signal layer and is stuck to the surface of the signal layer by the state of vacuum in the pits.

The invention is configured as the recording medium with the signal layer formed by aluminum or another flexible metal conductor.

As a second aspect of the present invention, the information reproducing apparatus disclosed in claim 4 is configured provided with an electron gun which can fire an electron beam at predetermined positions of a metal medium having a signal layer made of metal in which pits are formed, a detector which can detect an intensity of the electron beam reflected from the signal layer of the recording medium, and a reproducing circuit which reproduces the information of the recording medium based on the result of detection of the detector.

Further, as a third aspect of the present invention, an information reproducing apparatus disclosed in claim 5 is configured provided with a metal body which can be arranged so as to face the signal layer at predetermined positions of a recording medium to which a predetermined voltage is applied and having a signal layer made of metal in which pits are formed, a detecting circuit which can detect the existence of a change of a potential between the metal body and the signal layer, and a reproducing circuit which reproduces the information of the recording medium based on the result of detection of the detecting circuit.

As a fourth aspect of the present invention, the recording medium disclosed in claim 6 wherein provision is made of island-like fixed electrodes electrically insulated from the periphery, electrons can be injected into the fixed electrodes by the electron gun, and injected electrons can be removed, thereby imparting a memory function to the fixed electrodes.

The recording medium disclosed in claim 7 is configured as a recording medium disclosed in claim 6 provided with a substrate, a conductive layer laminated on the substrate surface, an insulating layer laminated on the conductive layer, and island-like fixed electrodes embedded in the insulating layer.

As a fifth aspect of the present invention, the information recording apparatus of the recording medium disclosed in claim 8 is configured provided with an electron gun which injects electrons in fixed electrodes of a recording medium provided with island-like fixed electrodes electrically insulated from the periphery via the insulating layer in the conductive layer.

The information recording apparatus disclosed in claim 9 is configured as the information reproducing apparatus disclosed in claim 8 further provided with an apparatus applying a predetermined voltage to the conductive layer of the recording medium and having a function enabling the information of the recording medium to be erased all together by applying a predetermined voltage to the conductive layer.

As a sixth aspect of the present invention, an information reproducing apparatus of the recording medium disclosed in claim 10 is configured provided with a counter electrode which can be arranged opposite to the fixed electrode of the recording medium in which island like fixed electrodes electrically insulated from the periphery via an insulating layer are provided in a conductive layer, a detector which can detect the change of an electrostatic capacitance between a fixed electrode and a counter electrode, and a reproducing circuit for reproducing the information of the recording medium based on the result of detection of the detector.

As a seventh aspect of the present invention, an information recording and reproducing apparatus disclosed in claim 11 is configured provided with both of the information recording apparatus disclosed in claim 8 and the information reproducing apparatus disclosed in claim 10.

The recording medium of the present invention is a recording medium which uses electrons as the sensing medium and can record a larger volume of information by using electrons in place of light similar to an electron microscope with which a finer pattern can be enlarged and viewed than with an optical microscope.

According to the recording medium according to the first aspect of the invention, a signal layer made of metal is used, therefore by emitting an electron beam to predetermined positions of this signal layer and detecting the electron beam reflected from the same, the information of the recording medium can be read. In this signal layer, pits can be easily formed by pressing etc.

Further, when a protective plate is provided covering the signal layer of the recording medium, dust or the like will not enter into the pits etc. at the time of storage. When this protective plate is peeled off, the signal layer made of metal in which the pits are formed is exposed.

Further, by forming the signal layer by an aluminum or other flexible metal conductor, the pits of the signal layer can be formed further easily with a higher precision.

Further, according to the information reproducing apparatus according to the second aspect of the invention, the electron beam emitted from the electron gun is reflected at a predetermined position of the signal layer. At this time, where there is a pit at the predetermined position, the electron beam is scattered and a weak electron beam is detected by the detector. Further, when there is no pit at the predetermined position, the electron beam is reflected at the detector side and a strong electron beam is detected by the detector. Then, based on the result of the detection, the information of the recording medium is reproduced at the reproducing circuit.

Further, according to the information reproducing apparatus according to the third aspect of the invention, if the signal layer of the recording medium and the metal body are brought into very close contact with each other, when there is no pit at a predetermined position of the signal layer, a discharge occurs between the signal layer and the metal body. Accordingly, when the metal body moves from a position where there is a pit to a position where there is no pit, a large change in potential occurs between the metal body and the signal layer and the existence of the change is detected by the detecting circuit. Then, based on the result of the detection, the information of the recording medium is reproduced by the reproducing circuit.

Further, when the signal layer of the recording medium and metal body are not brought into close contact with each other, the signal layer and the metal body do not cause a discharge and act as a capacitor. Accordingly, when the metal body moves from a position where there is a pit to a position where there is no pit, a change occurs in the capacitor potential between the metal body and the signal layer and the existence of the change is detected by the detecting circuit. Then, based on the result of the detection, the information of the recording medium is reproduced by the reproducing circuit.

In the recording medium according to the fourth aspect of the invention, island-like fixed electrodes electrically insulated from the periphery are provided embedded in for example the insulating layer. "1" or "0" can be recorded according to whether electrons are injected or not injected into the fixed electrodes by the electron gun. When a conductive layer is provided beneath the fixed electrodes, the electrons which do not reach the fixed electrodes are absorbed into the conductive layer beneath them and the charging of electrons of the insulating layer can be avoided. The electrons injected into the fixed electrodes are not discharged since the fixed electrodes are insulated from the periphery, thus there is a nonvolatile memory function. In this case, there is no change in the physical properties, therefore there is no limit in the number of times of writing. For the discharge of the injected electrons, if a voltage is applied to for example the conductive layer of the recording medium, electrons stored in the electrodes can be attracted by and absorbed into the conductive layer, whereby the information can be erased all together like the flash memory of a semiconductor memory.

Further, in the information recording apparatus according to the fifth invention, information can be recorded by injecting electrons into the fixed electrodes of the recording medium by the electron gun.

Before recording the information on the recording medium, in order to discharge the injected electrons so as to erase the information all together, if a function of applying a voltage to the conductive layer of the recording medium is imparted to the information recording apparatus, electrons stored in the electrodes can be absorbed into the conductive layer, whereby the information can be erased all together like the flash memory of a semiconductor memory.

In the information reproducing apparatus of the sixth aspect of the invention, when a counter electrode is placed close to a fixed electrode and the counter electrode comes into close contact with a fixed electrode into which electrons have been injected due to a proximity effect (capacitance bond), a large electrostatic capacitance is caused. When it comes into close contact with a fixed electrode into which electrons have not been injected, a small electrostatic capacitance is caused, therefore when the fixed electrode is scanned by this counter electrode, a change of electrostatic capacitance between the fixed electrode and the counter electrode occurs, this is detected by the detector, thus the information recorded on the recording medium can be reproduced based on the result of the detection of this detector.

In the information recording and reproducing apparatus of the seventh aspect of the present invention, by providing both of the information recording apparatus and the information reproducing apparatus, the recording and reproduction become possible by one apparatus, thus the apparatus becomes compact.

BEST MODE FOR WORKING THE INVENTION

Figure 1:
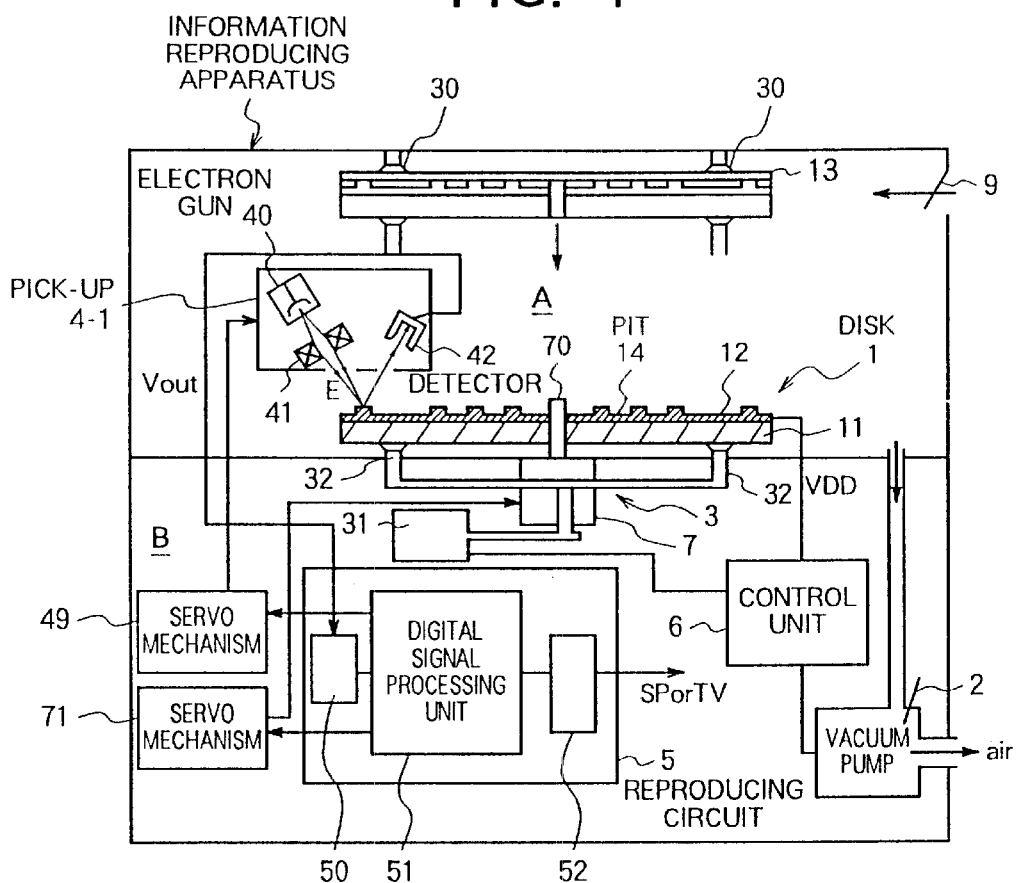
FIG. 1 is a schematic view of a recording medium according to one embodiment of the first and second aspects of the invention and an information reproducing apparatus thereof.

Below, embodiments of the present invention will be explained referring to the drawings.

Embodiments of First and Second Aspects of the Invention

FIG. 1 is a schematic view of a recording medium according to an embodiment of the first and second aspects of the invention and an information reproducing apparatus thereof.

The information reproducing apparatus of the present embodiment is divided into a container A containing a disk 1 (recording medium) and an apparatus chamber B containing various apparatuses.

A vacuum pump 2 for evacuating the interior of the container A is attached to the apparatus chamber B. A disk conveyance mechanism 3 for taking out and mounting the protective plate 13 of the disk 1 is installed in the container A and the apparatus chamber B. Further, a pick-up 4-1 for reading the information of the disk 1 is mounted on the container A. Further, the apparatus chamber B is provided with a reproducing circuit 5 for reproducing the information read by the pick-up 4-1 and a control unit 6 which controls the vacuum pump 2 and the disk conveyance mechanism 3 and, at the same time, applies a predetermined voltage VDD to the signal layer 12 of the disk 1.

Figure 2:
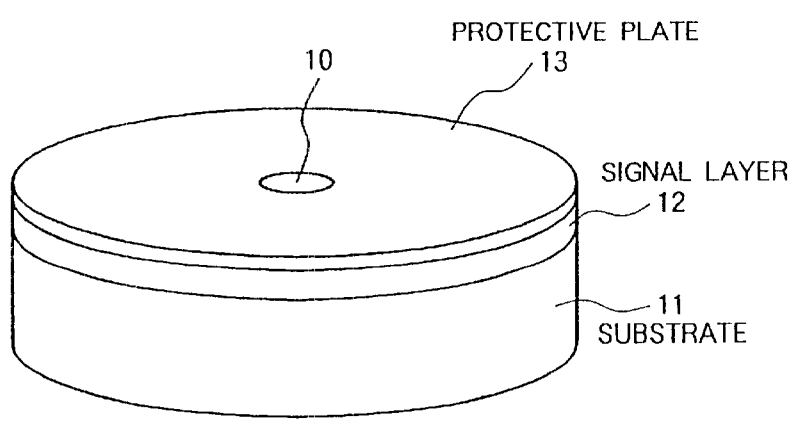
FIG. 2 is a perspective view of the recording medium of FIG. 1.

The disk 1, as shown in FIG. 2, is a disk-like member having a hole 10 at the center thereof and having a size of a diameter of 12 cm and has a three-layer structure of a substrate 11, a signal layer 12, and a protective plate 13.

Specifically, the substrate 11 may have a label etc. adhered to the lower surface (lower surface of FIG. 2). The thickness thereof is set to 1000 $\mu$m to 1200 $\mu$m.

Figure 3:
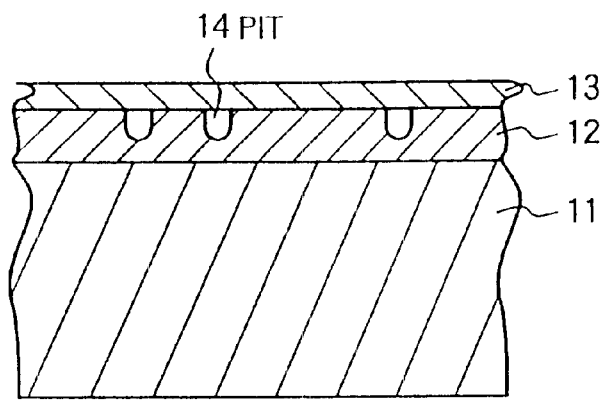
FIG. 3 is a partially sectional view of the recording medium of FIG. 2.
Figure 4:
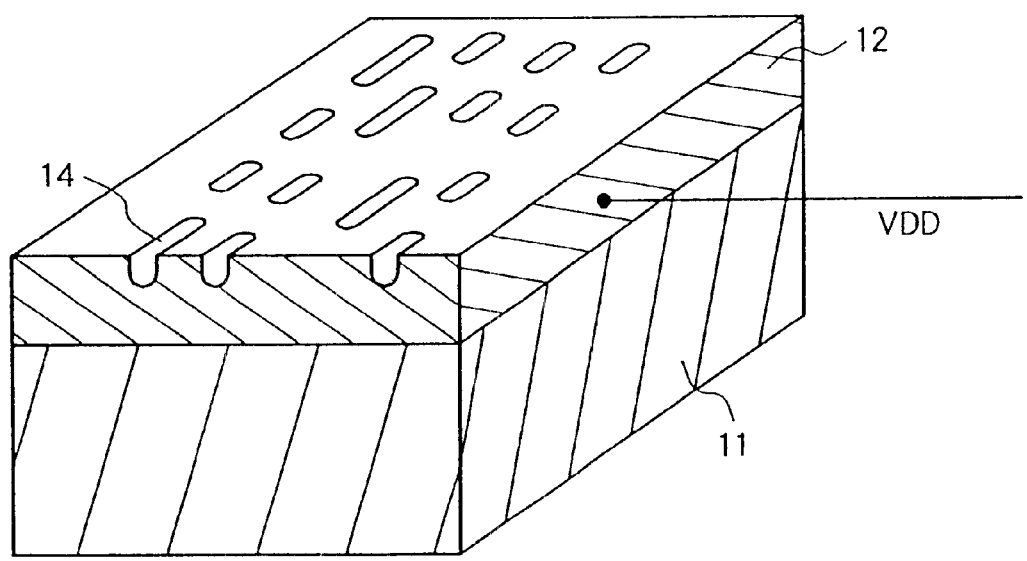
FIG. 4 is a perspective view of the structure of pits and a voltage application state of the recording medium of FIG. 2 as a partially sectional view.

The signal layer 12 is made of aluminum having a thickness of 1 $\mu$m and is coated on the substrate 11. On an upper surface of the signal layer 12, as shown in FIG. 3 and FIG. 4, a plurality of pits 14 are formed along the track. Note that it is also possible to constitute the substrate 11 by aluminum and omit the signal layer 12.

The pits 14 are formed by pressing the required portions of the signal layer 12 to make recesses in the surface. Here, since the signal layer 12 is soft aluminum, the pits 14 can be formed easily with a high precision by the pressing work. Namely, by making the signal layer 12 by aluminum, a reduction of the number of fabrication steps and the product cost is achieved.

The protective plate 13 is a thin aluminum plate for preventing dust etc. from entering into the pits 14 etc. of the signal layer 12 and is held by vacuum on the upper surface of the signal layer 12.

Namely, by evacuating the interior of the pits 14 of the signal layer 12 and drawing the protective plate 13 to the signal layer 12, prevention of breakage during the storage of the disk 1 and the removal of the protective plate 13 at the time of use are facilitated.

Such a disk 1 can be inserted into the container A via a disk insertion/eject port 9 of the information reproducing apparatus shown in FIG. 1.

The vacuum pump 2 is a pump which operates under the control of the control unit 6 at the time of insertion of the disk 1 to discharge the air in the container A to the outside of the apparatus and evacuate the interior of the container A. Further, this vacuum pump 2 is controlled by the control unit 6 so as to operate in reverse at the time of ejection of the disk 1 and feed the air outside of the apparatus into the container A.

The disk conveyance mechanism 3 is a mechanism for performing detachment and attachment of the protective plate 13 of the disk 1 and mounting the disk 1 on a rotation shaft 70 of a motor 7 controlled by a servo mechanism 71 and has a fixed attraction arm 30 attached to the upper surface of the container A and a movable attraction arm 32 vertically moved by an actuator 31.

Specifically, the fixed attraction arm 30 and the movable attraction arm 32 have suction cups formed by a flexible material such as rubber at the front ends thereof. Further, the actuator 31 operates so as to raise the movable attraction arm 32 at the end of the operation of the vacuum pump 2 after the insertion of the disk 1 and then move this down under the control of the control unit 6. Further, this actuator 31 operates so as to move the movable attraction arm 32 up at the time of removal of the disk 1 and move the movable attraction arm 32 down at the end of the reverse operation of the vacuum pump 2.

The pick-up 4-1 for reading the information of the disk 1 conveyed by such a disk conveyance mechanism 3 is provided with an electron gun 40 and a detector 42.

The electron gun 40 is an apparatus for emitting an electron beam E to a predetermined position of the signal layer 12 of the disk 1. The electron beam E is focused by a focusing coil 41 arranged at the output side of the electron gun 40.

The detector 42 is an apparatus which captures the electron beam E reflected from the signal layer 12 and detects the intensity thereof.

Figure 5:
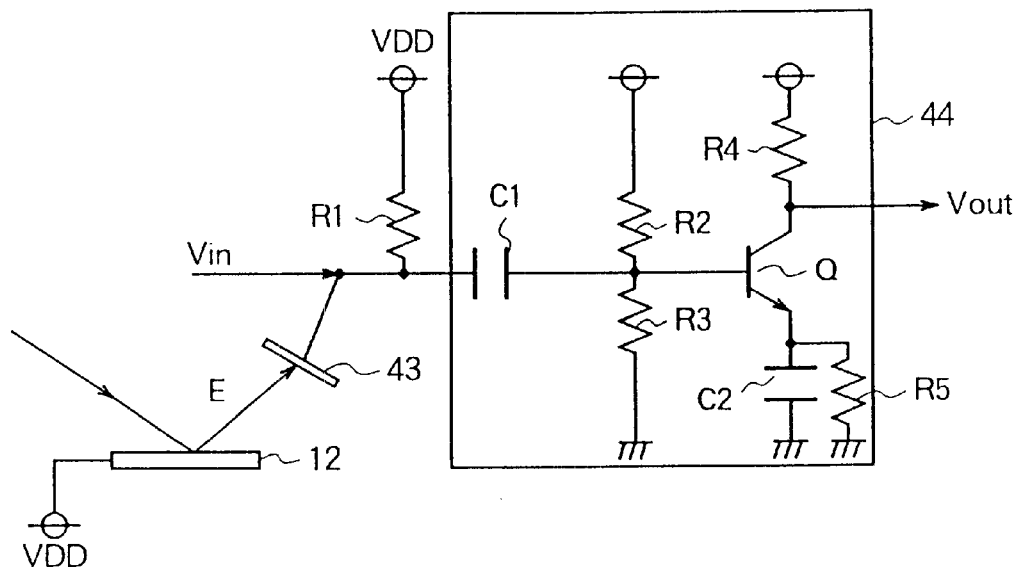
FIG. 5 is a circuit diagram of the detector of FIG. 1.

FIG. 5 is a circuit diagram of this detector 42.

As shown in FIG. 5, this detector 42 has a metal foil 43 made of aluminum or the like capturing electrons of the electron beam E reflected at the signal layer 12 of the disk 1 and an output voltage generating circuit 44.

Specifically, the voltage VDD from the control unit 6 is applied to the metal foil 43 via a load R1.

Further, the output voltage generating circuit 44 has a capacitor C1 for removing the DC component with an input end connected to the connecting point of the metal foil 43 and the load R1. The output end of this capacitor C1 has connected to it a connecting point of the bias resistors R2 and R3 for securing the operating voltage of the transistor Q. A base of this transistor Q is connected to the connecting point of the resistors R2 and R3. A collector of this transistor Q is connected via a resistor R4 to the voltage VDD, and an emitter is connected to a parallel by-pass capacitor C2 and the resistor R5.

By this, when the metal foil 43 captures the electron beam E, an input voltage Vin corresponding to the electron beam E is produced. This input voltage Vin is converted to an output voltage Vout, that is, a voltage pulse in the form of a delta function, by the transistor Q.

The movement of such a pick-up 4-1 with the detector 42 and electron gun 40 is controlled by a tracking and focus servo mechanism 49 shown in FIG. 1.

The reproducing circuit 5 is a well known circuit used in the player of a CD etc. It is provided with an RF amplifier 50, a digital signal processing unit 51, a D/A converting unit 52, etc. and reproduces the information of the disk 1 based on the output voltage Vout from the pick-up 4-1.

Next, an explanation will be made of the operation of the information reproducing apparatus of the present embodiment.

As shown in FIG. 1, when the disk 1 with the protective plate 13 side facing upward is inserted into the container A, the vacuum pump 2 operates, air in the container A is discharged to the outside of the apparatus, and the interior of the container A becomes a vacuum state.

Next, the actuator 31 of the disk conveyance mechanism 3 operates, the movable attraction arm 32 rises, and the fixed attraction arm 30 pushes against the upper surface of the disk 1. By this, the substrate 11 of the disk 1 is attracted by the movable attraction arm 32 and the protective plate 13 is attracted by the fixed attraction arm 30. Thereafter, the actuator 31 operates in reverse, and the movable attraction arm 32 moves downward. As a result, as indicated by a solid line, the protective plate 13 drawn by the fixed attraction arm 30 is peeled from the signal layer 12, and the disk 1 at which the signal layer 12 is exposed is fitted over the rotation shaft 70 of the motor 7.

In this state, when the reproducing circuit 5 is operated, the disk 1 rotates. At the same time, the pick-up 4-1 moves to a predetermined position on the disk 1, then scanning is performed by the pick-up 4-1 in a state with the voltage VDD applied to the signal layer 12.

Namely, the electron gun 40 of the pick-up 4-1 fires the electron beam E to the signal layer 12 along the track of the disk 1. This electron beam E is focused by the focusing coil 41 and strikes the signal layer 12 which has become a positive polarity by the voltage VDD with a high efficiency.

At this time, when the electron beam E strikes a concave pit 14 of the signal layer 12, the electron beam E is scattered by the pit 14, therefore almost no electron beam E is detected by the detector 42. Conversely, when the electron beam E strikes a flat part other than a pit 14, the electron beam E is reflected in the direction of the detector 42, therefore the electron beam E is detected at the detector 42.

Accordingly, when the electron gun 40 scans the signal layer 12 along the tracks, the amount of electrons of the electron beam E captured by the metal foil 43 shown in FIG. 5 is increased or decreased depending upon the existence of the pits 14. The input voltage Vin changes in accordance with this.

Figure 6A:
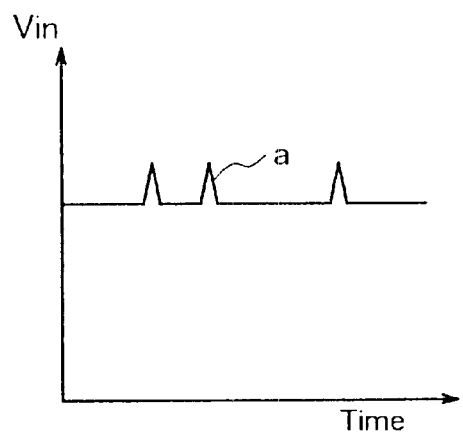
FIG. 6A shows an input signal of a signal waveform diagram at the time of reading by the detector of FIG. 5.

Specifically, as shown in FIG. 6A, in the scanning of the pit 14 part, when the input voltage Vin is held substantially constant and a flat part other than the pit 14 is scanned, a large rise a is produced in the input voltage Vin. Accordingly, by setting the flat part as the binary "0" and setting a pit 14 as "1", the binary digital signal recorded in the signal layer 12 is read by the action of the electron gun 40 and the detector 42, and an input voltage Vin indicating the content is input to the output voltage generating circuit 44.

Figure 6B:
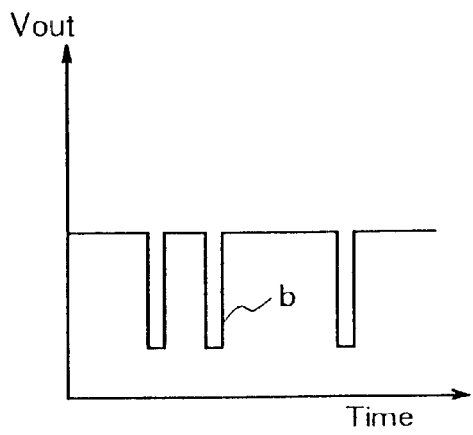
FIG. 6B shows an output signal thereof.

The input voltage Vin input to the output voltage generating circuit 44 is amplified and converted by the transistor Q. As a result, as shown in FIG. 6B, an output voltage Vout having a voltage pulse b of an extremely low level corresponding to the rise a of the input voltage Vin is output from the output voltage generating circuit 44 to the reproducing circuit 5 and reproducing circuit 5. The reproducing circuit 5 then reproduces the audio or reproduces the video.

When the reproduction is ended, the movable attraction arm 32 of the disk conveyance mechanism 3 shown in FIG. 1 rises, lifts the disk 1, and aligns the protective plate 13 attracted by the fixed attraction arm 30 with the signal layer 12. Simultaneously with this, the vacuum pump 2 performs the reverse operation, and the air outside of the apparatus is fed into the container A. As a result, the interior of the container A becomes a positive pressure in state and only the interior of the pits 14 becomes vacuum in state, therefore the protective plate 13 is attracted by the signal layer 12 and the disk 1 is restored to the state before insertion. In this state, the disk 1 is pulled out of the container A and stored.

In this way, the present embodiment is structured so that, like a scanning electronic microscope, scanning is carried out while firing the electron beam E from the electron gun 40 to the signal layer 12 of the disk 1 so as to read the information recorded on the signal layer 12, therefore the following effects can be obtained.

Figure 14:
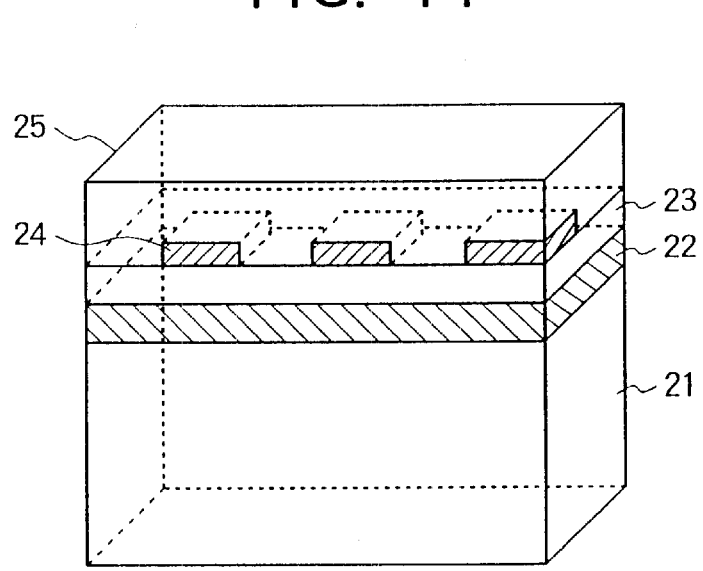
FIG. 14 is a partially sectional view of one example of the recording medium of a fourth aspect of the invention.

Namely, the precision of detection by the electron beam E is higher by two or more orders than the precision of detection by a laser beam L like with the CD shown in FIG. 14. Accordingly, the size of the pits 14 formed in the signal layer 12 of the disk 1 can be made very small. As a result, in comparison with the conventional CD and DVD, a disk 1 which can record a larger order of information can be provided and, in addition, that information can be read at a high speed.

Further, the principle of the reading operation by the pick-up 4-1 is substantially the same as that of the scanning electronic microscope as described above, but the pick-up 4-1 does not require an object coil, ocular coil, polarization plate, etc. as in an electron microscope, therefore the structure becomes simpler and the manufacturing cost can be kept low in comparison with an electron microscope by that amount. Further, the distance of the pick-up 4-1 and the disk 1 is substantially constant, therefore a small intensity of the electron beam E of the electron gun 40 is sufficient. As a result, a reduction of the power consumption and extension of the service life of the apparatus can be achieved.

Figure 7:
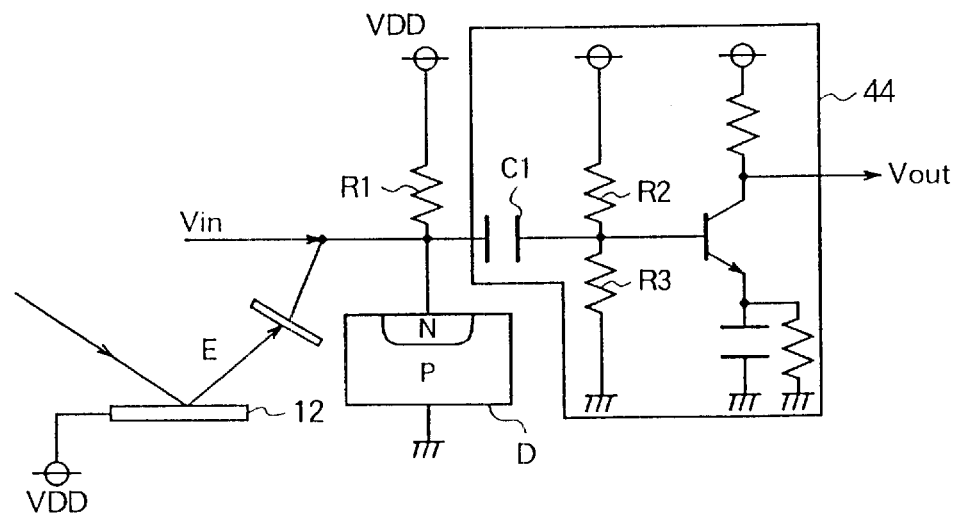
FIG. 7 is a circuit diagram of a modification of the detector of FIG. 1.

FIG. 7 is a circuit diagram of a modification of a detector applied to the pick-up 4-1.

This detector is structured with the diode D connected to the input end of the capacitor C1 of the output voltage generating circuit 44 and grounded. Specifically, it is connected to the input end of the capacitor C1 of the N layer of the diode D, and the P layer is grounded.

By this, when a high voltage, for example, lightning, is applied to the voltage VDD, a large amount of electrons flow through the N layer, and this diode D acts as a protective diode. Further, by the capacitance between the N layer and the P layer, it becomes possible to adjust the coupling with the capacitance of the circuit of capacitor C1 and subsequent circuits.

Note that the present invention is not limited to the above embodiments. Various modifications and changes are possible within the range of the gist of the invention.

For example, in the present embodiment, the signal layer 11 and the substrate 12 were made of aluminum, but the material is not limited to this so far as it is a metal. A titanium alloy etc. which can be easily pressed can be used as well.

Further, in the present embodiment, the container A was evacuated at the time of the insertion of the disk 1, but the degree of vacuum of the container A can be weakened within a permissible range of the reading precision.

Embodiment of Third Aspect of Invention

Next, an explanation will be made of the information reproducing apparatus according to an embodiment of the third aspect of the invention.

Figure 8:
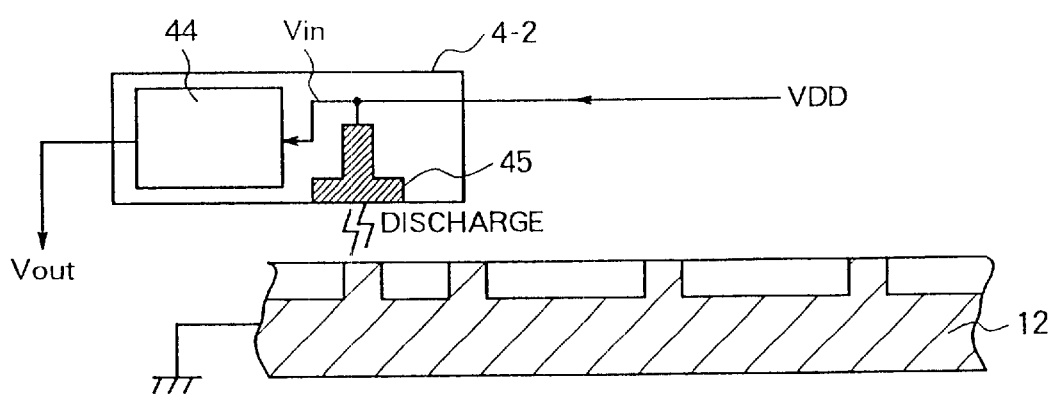
FIG. 8 is a schematic view of a principal part of the information reproducing apparatus according to one embodiment of the third invention.

FIG. 8 is a schematic diagram of a principal part of the present embodiment. Note that the same members as those of FIG. 1 through FIG. 7 are explained given the same reference numerals.

Figure 9:
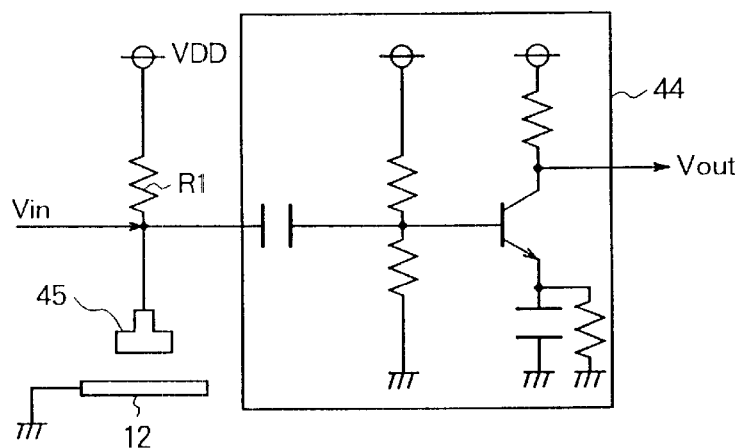
FIG. 9 is a circuit diagram of an output voltage generating circuit of a pick-up of FIG. 8.

The pick-up 4-2 of the present embodiment is provided with a metal body 45 to which the voltage VDD of 5 volts is applied from the control unit 6. Then, this metal body 45, as shown in FIG. 8 and FIG. 9, has an output voltage generating circuit 44 connected as the detecting circuit. Further, the signal layer 12 of the disk 1 is grounded. The pick-up 4-2 is scanned in a state with the metal body 45 brought into close proximity to this signal layer 12.

Figure 10A:
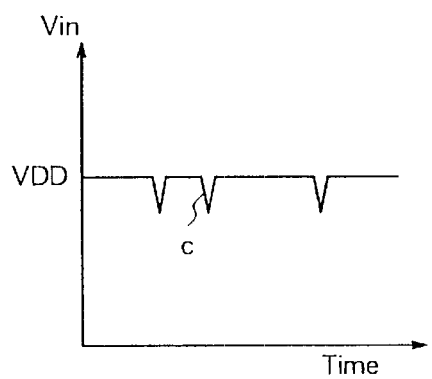
FIG. 10A shows the input signal of the signal waveform diagram at the time of reading by a pick-up of FIG. 8.

By this, when the metal body 45 reaches a flat part other than a pit 14, the distance between the metal body 45 and the signal layer 12 becomes very short, therefore a discharge is generated between the metal body 45 and the signal layer 12. Accordingly, when the scanning is carried out by the metal body 45 along the track of the signal layer 12, the discharge is produced or not produced according to the existence of a pit 14. As a result, as shown in FIG. 10A, by the scanning of the pit 14 part, the input voltage Vin holds substantially the voltage VDD. When a flat part other than a pit 14 is scanned, a large fall c is produced in the input voltage Vin.

Figure 10B:
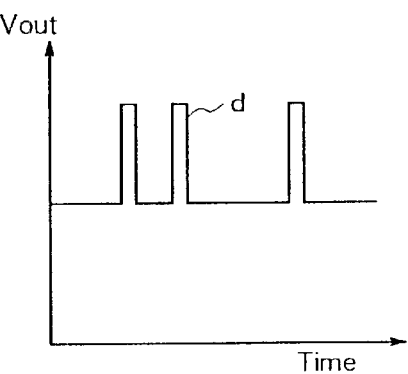
FIG. 10B shows the output signal thereof.

When this input voltage Vin is input to the output voltage generating circuit 44, it is amplified and converted by the transistor Q, and, as shown in FIG. 10B, an output voltage Vout having a voltage pulse d of an extremely high level corresponding to the fall c is output. This output Vout is input from the output voltage generating circuit 44 to the reproducing circuit 5.

In this way, according to the information reproducing apparatus of the present embodiment, the existence of a pit 14 can be detected only by the metal body 45 without the use of the electron gun, the focusing coil, etc., therefore the structure becomes simpler and, as a result, the number of the fabrication steps and the manufacturing cost can be further reduced.

The rest of the structure, mode of operation, and effect are the same as those of the embodiments of the first and second aspects of the invention, therefore the description thereof will be omitted.

Other Embodiment of Third Aspect of Invention

Next, an explanation will be made of the information reproducing apparatus according to another embodiment of the third aspect of the invention.

Figure 11:
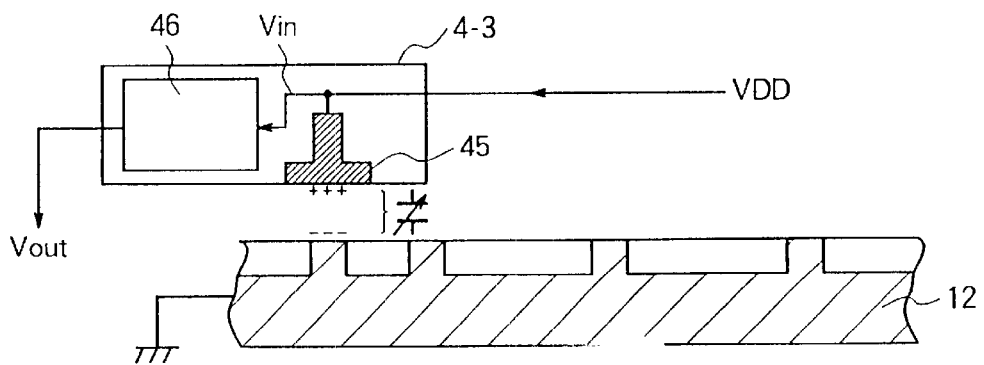
FIG. 11 is a schematic view of a principal part of another embodiment of a third aspect of the invention.

FIG. 11 is a schematic view of the principal part of the present embodiment. Note that the same members as those of FIG. 8 are explained given the same reference numerals.

In the pick-up 4-3 of the present embodiment, the output voltage generating circuit 46 serving as the detecting circuit is connected to the metal body 45 to which the voltage VDD is applied. However, this pick-up 4-3 performs the scanning along the track of the signal layer 12 in a state where the metal body 45 is separated from the signal layer 12 by a distance that does not cause a discharge.

Figure 12:
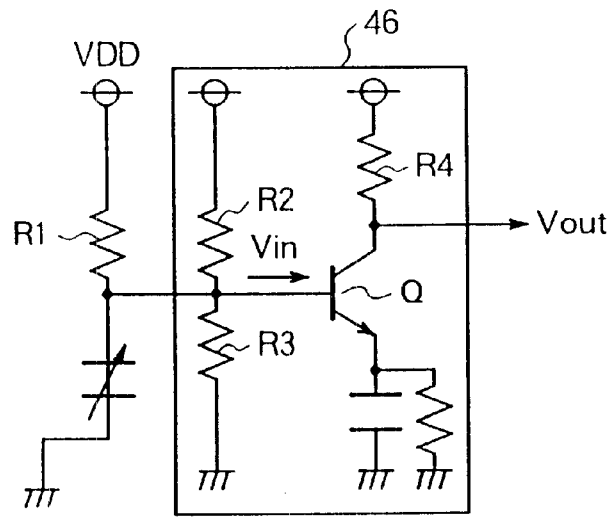
FIG. 12 is a circuit diagram of an output voltage generating circuit of a pick-up of FIG. 11.

Accordingly, the metal body 45 and the signal layer 12 function as a variable capacitor with an electrostatic capacitance which changes according to the existence of a pit 14. For this reason, the output voltage generating circuit 46 is structured with the capacitor C1 removed from the output voltage generating circuit 44 as shown in FIG. 12.

Figure 13A:
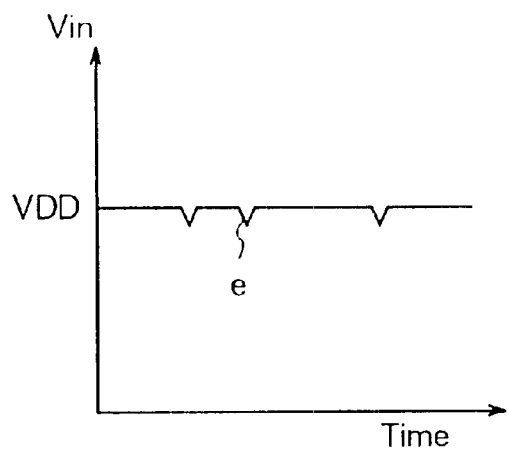
FIG. 13A shows the input signal of the signal waveform diagram at the time of reading by a pick-up of FIG. 11.

By such a configuration, when the metal body 45 reaches a flat part other than a pit 14, the distance between the metal body 45 and the signal layer 12 becomes short, therefore the electrostatic capacitance is increased. Accordingly, when the scanning is carried out by the metal body 45 along a track of the signal layer 12, the electrostatic capacitance of the capacitor constituted by the metal body 45 and the signal layer 12 becomes larger or smaller according to the existence of a pit 14. As a result, as shown in FIG. 13A, by the scanning of the pit 14 part, the input voltage Vin is held at substantially the voltage VDD. When a flat part other than a pit 14 is scanned, a small fall e is produced in the input voltage Vin.

Figure 13B:
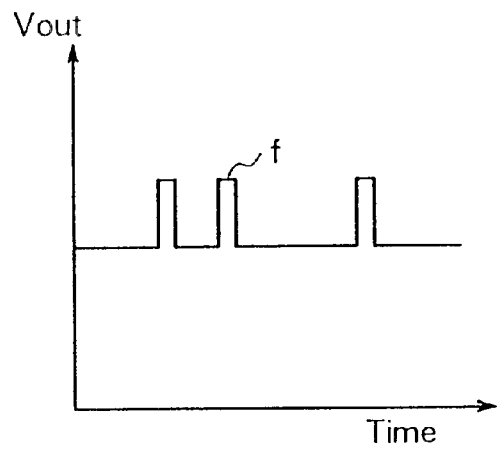
FIG. 13B shows the output signal thereof.

Then, when this input voltage Vin is input to the output voltage generating circuit 46, it is amplified and converted by the transistor Q. As shown in FIG. 13B, an output voltage Vout having a voltage pulse f of the level corresponding to the fall e is output. This output voltage Vout is input from the output voltage generating circuit 46 to the reproducing circuit 5.

In this way, according to the information reproducing apparatus of the present embodiment, the existence of a pit 14 can be detected by the change of capacitance between the metal body 45 and the signal layer 12 without use of the discharging phenomenon, therefore an improvement of durability of the metal body 45 and the signal layer 12 can be achieved.

The rest of the structure, action, and effect are the same as those of the embodiments, therefore the description thereof will be omitted.

Embodiment of Fourth Aspect of Invention

The recording medium according to the first aspect to the third aspect of the invention was a read only recording medium (ROM), but the recording medium of the following embodiment is a recording medium functioning as a non-volatile memory corresponding to a so-called flash memory of a semiconductor memory.

Figure 15A:
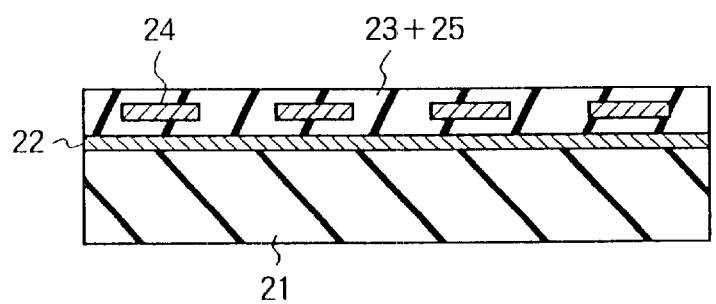
FIG. 15A is a sectional view of the recording medium of the fourth aspect of the invention.
Figure 15B:
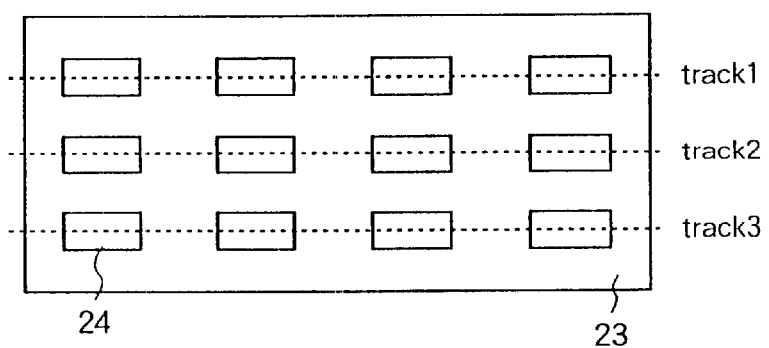
FIG. 15B is a plan view thereof.

In this second recording medium 20, for example, as shown in FIG. 14 and FIG. 15A, a conductive layer 22 constituted by a metal such as aluminum is provided on a substrate 21, an insulating layer 23 made of a silicon oxide or the like is provided on this conductive layer 22. Further, on this insulating layer, as shown in FIG. 15B, fixed electrodes 24 made of a metal such as aluminum are formed in the form of islands at a predetermined pitch along the track. These fixed electrodes 24 are structured covered by the protective insulating layer 25.

In this structure, each fixed electrode 24 is coated by the insulating layer 23 and the protective insulating layer 25 as shown in FIG. 15A and insulated from the periphery. The length of the fixed electrode 24 can be reduced to 0.01 $\mu$m, that is, about 100 angstroms. This indicates that a recording density of several hundreds of times the limit of the DVD or the like using light as a medium—which is about 0.3 $\mu$m—is possible.

Figure 16:
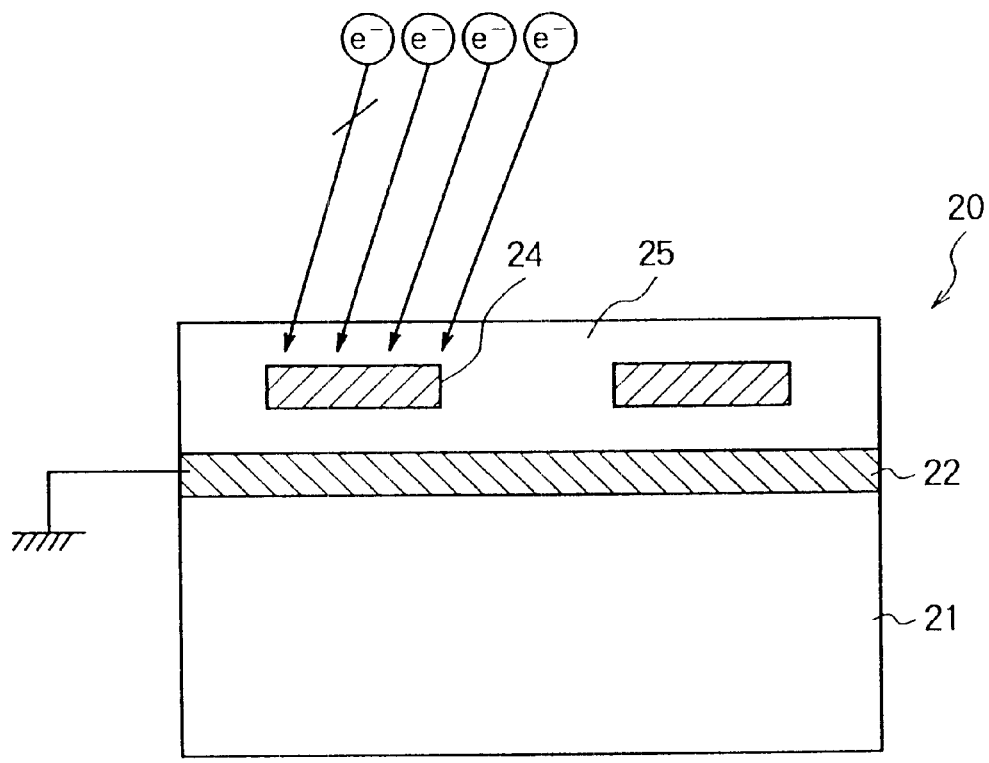
FIG. 16 is a conceptual view explaining a situation of writing the information on the recording medium of the fourth aspect of the invention.
Figure 17:
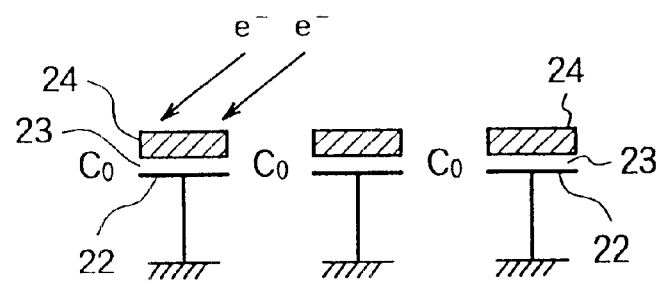
FIG. 17 is a conceptual view explaining the state of writing information on the recording medium of the fourth aspect of the invention.

When writing the information on this recording medium 20, as shown in FIG. 16, the conductive layer 22 is set to the GND in vacuum and the electron gun etc., is made to scan while injecting electrons to a predetermined fixed electrode 24 through the protective insulating layer 25. This is charged to minus to store information. By this, as shown in FIG. 17, the fixed electrode 24 is charged to a capacitance $C_0$ with the conductive layer 22 (GND) beneath this. When the electrons are injected into the fixed electrode 24 by the electron gun, the electrons which are not injected into the fixed electrode 24 are absorbed into the conductive layer 22 of the lower layer set to the GND. This can prevent the charge of the electrons of the insulating films 23 and 25.

In this way, the electrons injected into the fixed electrode 24 are held as they are like the floating gate of an EEPROM (electrically erasable programmable ROM) of a semiconductor memory since the fixed electrodes 24 are insulated from the periphery and functions as a nonvolatile memory.

Figure 18A:
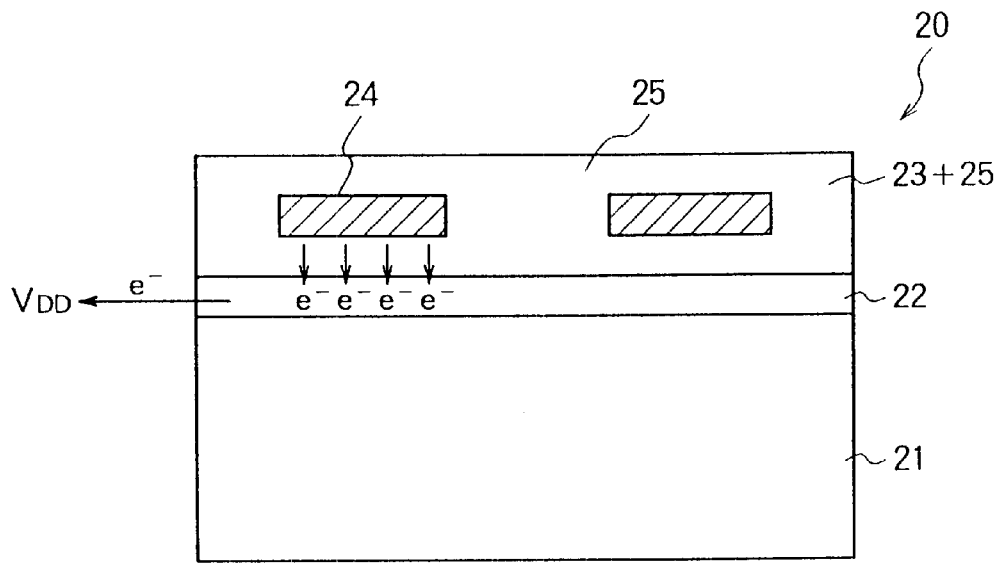
FIG. 18A and FIG. 18B are conceptual views explaining the full erasure of the recording medium of the fourth aspect of the invention.

Further, so as to discharge the electrons injected into the fixed electrodes and erase the information, the following two methods can be considered. First, as shown in FIG. 18A, by raising the voltage of the conductive layer 22 beneath of the fixed electrode 24 to VDD, the electrons of the fixed electrode 24 can be absorbed into the conductive layer 22, whereby full erasure can be performed like a flash memory. The electrons are attracted by a tunnel current passing through the insulating film by the same principle as that of the F-N current of a flash memory. For this reason, when this method of erasure is adopted, the thickness of the insulating layer 23 isolating the fixed electrode 24 and the conductive layer 22 is made thin.

Figure 18B:
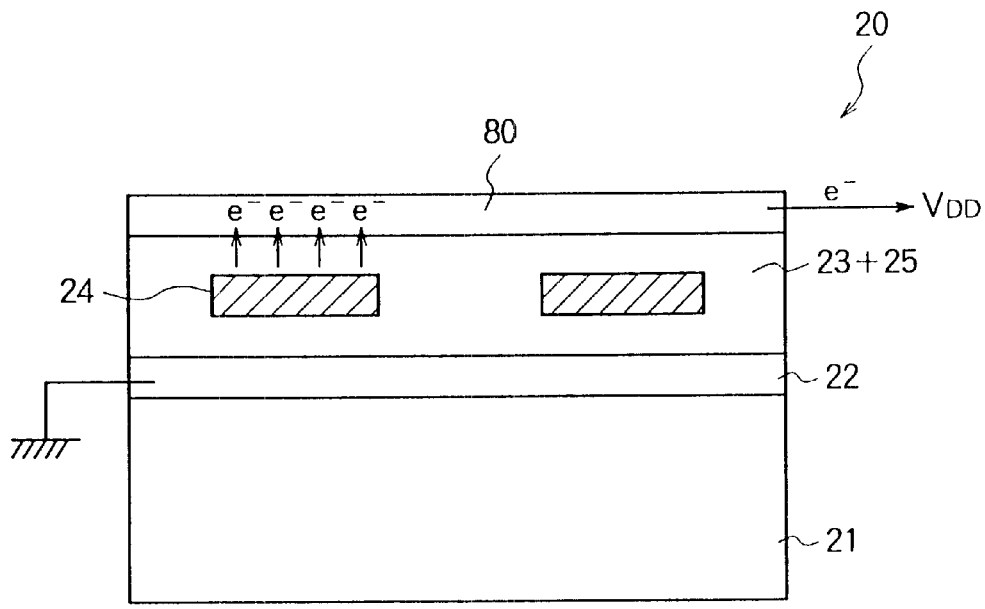

In another erasing method, as shown in FIG. 18B, by closely adhering the conductive plate 80 serving as the erasing head to the surface of the recording medium 20 and applying VDD to this conductive plate 80, the electrons of the fixed electrode 24 can be absorbed by the conductive plate 80. In this case, it is not necessary to reduce the thickness of the insulating layer 23 isolating the conductive layer 22 and the fixed electrode 24.

Further, reading can be carried out by detecting the change of the electrostatic capacitance similar to the other embodiment of the third aspect of the invention. An explanation will be made of this detection mechanism referring to FIG. 19 to FIG. 21. Note that the same members as those of FIG. 11 are given the same reference numerals and explained.

Figure 19:
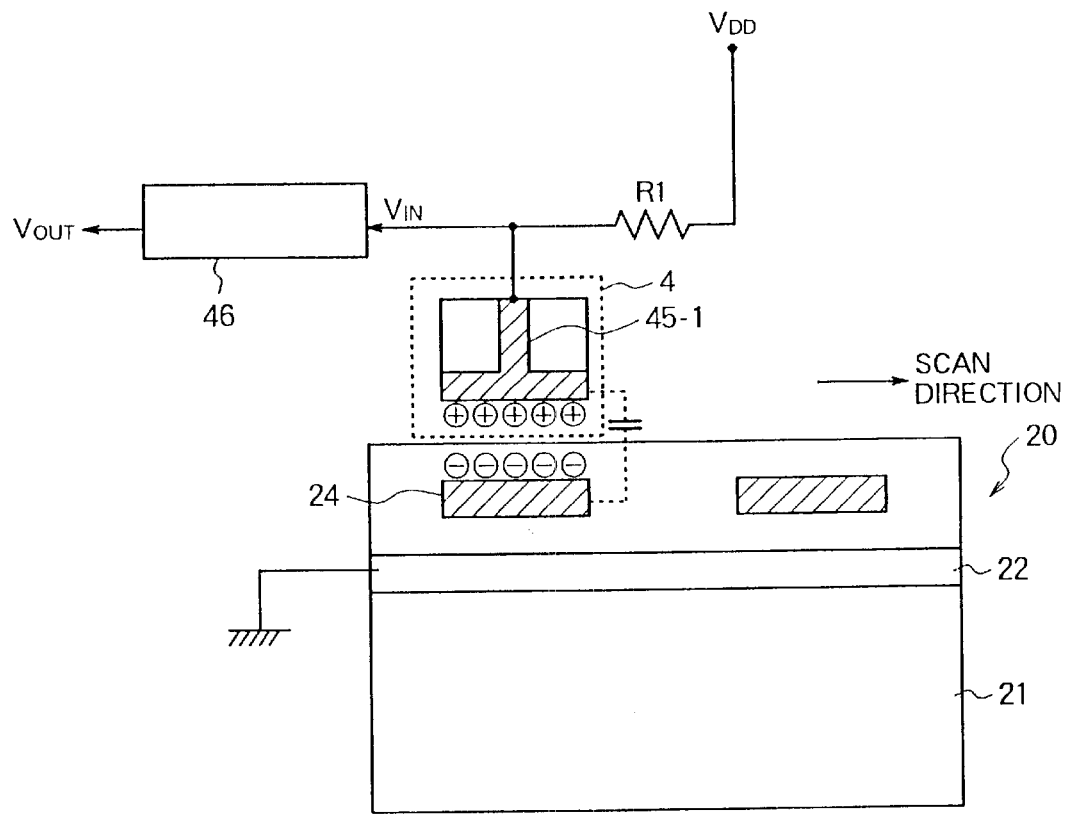
FIG. 19 is a conceptual view explaining the state of reading of the recording medium of the fourth aspect of the invention.

As shown in FIG. 19, the counter electrode 45-1 constituting the pick-up 4 is given the voltage VDD and connected to the output voltage generating circuit 46 serving as the detecting circuit. This pick-up 4 makes the counter electrode 45-1 scan along the track of the fixed electrodes 24. Note that, in the figure, the counter electrode 24 is spaced from the surface of the recording medium 20, but it is also possible to closely adhere the surface of the counter electrode 45-1 to the surface of the recording medium 20.

When the counter electrode 45-1 is brought into proximity with the fixed electrode 24, due to the proximity effect, as shown in FIG. 19, a proximity electrostatic effect (capacitance bond) is produced between the fixed electrode 24 and the counter electrode 45-1. A conceptual view is shown in FIG. 20.

Figure 21A:
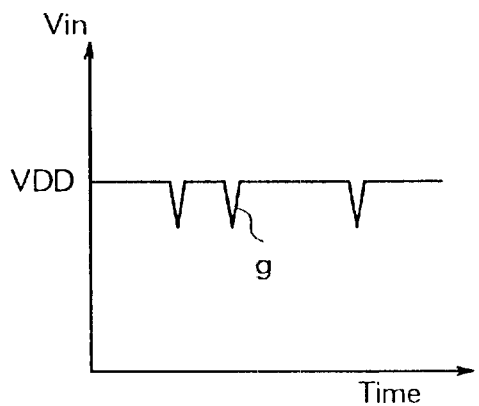
FIG. 21A shows the input signal of the signal waveform diagram at the time of reading by a pick-up of FIG. 19.

By such a configuration, when the counter electrode 45-1 faces a charged fixed electrode 24, the electrostatic capacitance is increased in comparison with a case where the counter electrode 45-1 faces a fixed electrode 24 which is not charged. Accordingly, when the scanning is carried out by the counter electrode 45-1 along the track of the fixed electrode 24, the electrostatic capacitance of the capacitor constituted by the fixed electrode 24 and the counter electrode 45-1 becomes large or small according to the existence of the charge of the fixed electrode 24. As a result, as shown in FIG. 21A, by the scanning of the fixed electrode 24 which is not charged, the input voltage Vin is held at substantially the same voltage VDD. When the counter electrode is brought into proximity to the charged fixed electrode 24, a small fall g is produced in the input voltage Vin.

Figure 20:
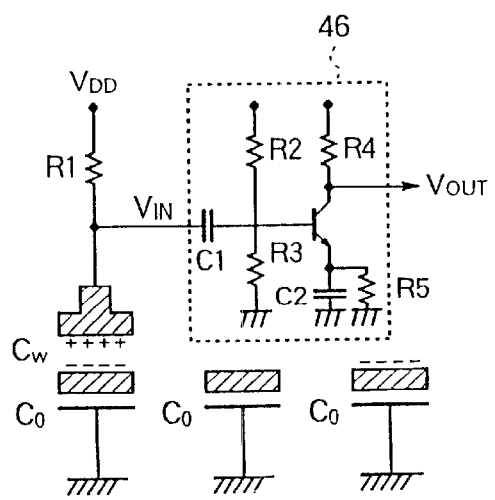
FIG. 20 is a conceptual view explaining the state of reading of the recording medium of the fourth aspect of the invention.
Figure 21B:
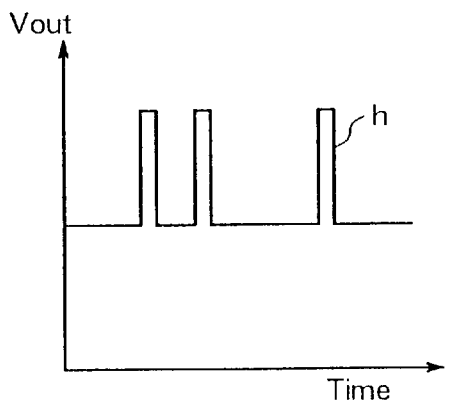
FIG. 21B shows the output signal thereof.

Then, when this input voltage Vin is input to for example the output voltage generating circuit 46 as shown in FIG. 20, it is amplified and converted by the transistor Q, and as shown in FIG. 21, an output voltage Vout having a voltage pulse h of a level corresponding to the fall g is output. This output voltage Vout is input from the output voltage generating circuit 46 to the reproducing circuit.

In this way, since the present recording medium uses electrons as the sensing medium, it can write and read a larger amount of information exceeding the limit of the wavelength of light. The writing can be carried out by injecting electrons into the fixed electrodes, and full erasure can be carried out, therefore it functions as a nonvolatile memory similar to a flash memory of a semiconductor. In a semiconductor flash memory, an X-decoder circuit/Y-decoder circuit is provided on the X-Y plane, and memory cells arranged in the form of a matrix are selected from electrically, but in the present recording medium, the information is specified according to for example the rotation of the disk and the positional movement in the radial direction (in general the direct mechanical positional movement of the pick-up equipped with the electron gun and the counter electrode).

In this way, the writing, reading, and erasing do not make any change to the physical shape of the recording medium, therefore there is no limit to the number of times of the writing, reading, and erasing.

In the manufacturing method of such a recording medium, for example, the substrate 21 is shaped to a disk by a plastic or the like, a metal such as aluminum is laminated on this disk-like substrate 21 by vapor deposition or the like, and a conductive layer 22 is formed. Next, an insulating layer, for example, silicon oxide, is deposited by a CVD process or the like. Recesses for the fixed electrodes are formed in this insulating layer 22 by pressing or the like, a molten metal such as aluminum flows into the recesses, the recesses are buried by the metal, and thereby fixed electrodes are formed. Thereafter, a protective insulating layer such as silicon oxide is formed by CVD or the like to coat the fixed electrodes by the insulating layer and thus the present recording medium is produced.

Embodiment of Fifth to Seventh Aspects of Invention

Next, an explanation will be made of an example of an information recording and reproducing apparatus provided with both of the information recording apparatus and information reproducing apparatus using a recording medium functioning as a nonvolatile memory referring to FIG. 22.

This information recording and reproducing apparatus is divided into a container A containing the disk-like recording medium 20 and an apparatus chamber B containing various apparatuses. A vacuum pump 2 evacuating the interior of the container A is attached to the apparatus chamber B. A pick-up 4-4 performing the writing and reading of the information to and from the recording medium 20 and a rotating disk 70 on which the recording medium is mounted are provided in the container A. Further, the apparatus chamber B is provided with a processing circuit 5 which performs the writing of the information by the pick-up 4-4 and, at the same time, reproduces the read information and a control unit 6 which controls the vacuum pump 2 and, at the same time, applies a predetermined voltage VDD to the conductive layer 22 of the recording medium 20.

The vacuum pump 2 operates under the control of the control unit 6 at the time of insertion of the recording medium 20, discharges the air in the container A to the outside of the apparatus, and evacuates the interior of the container A. When taking out the recording medium, the container A is made to restore the atmospheric pressure under the control of the control unit 6.

Further, the pick-up 4-4 is provided with the electron gun 40 and the counter electrode 45-1. Note that it is also possible to construct different pick-up by the electron gun and the counter electrode.

The electron gun 40 is controlled so as to inject the electron beam to the predetermined fixed electrode by the digital signal processing unit 51.

The counter electrode 45-1 is given the voltage VDD as shown in FIG. 19 and FIG. 20 and connected to the output voltage generating circuit 46 as the detecting circuit. This output voltage generating circuit 46 has a capacitor C1 for removing the DC component with an input end connected to the connecting point of the counter electrode 45-1 and the load R1, one example of which being shown in FIG. 20. To the output end of this capacitor C1 is connected a connecting point of the bias resistors R2 and R3 for securing the operating voltage of the transistor Q. Then, the connecting point of these resistors R2 and R3 is connected to the base of the transistor Q. The collector of this transistor Q is connected via the resistor R4 to the voltage VDD, while the emitter is connected to the parallel by-pass capacitor C2 and the resistor R5.

By this, the input voltage Vin from the counter electrode is converted to the output voltage Vout, which is a voltage pulse in the form of a delta function, by the transistor Q.

Figure 22:
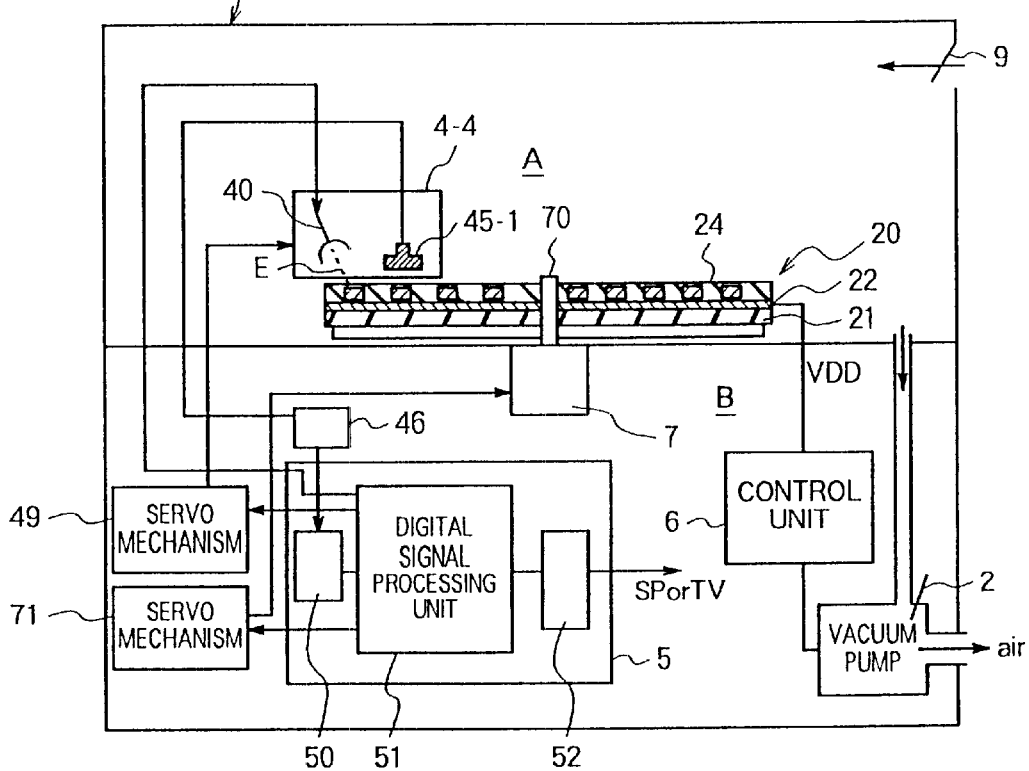
FIG. 22 is a schematic view of the structure of the information recording and reproducing apparatus of a seventh aspect of the invention.

The movement of the pick-up 4-4 provided with the electron gun 40 and the counter electrode 45-1 is controlled by the tracking and focus servo mechanism 49 shown in FIG. 22.

Further, the rotating disk 70 is rotated by the motor 7 controlled by the servo mechanism 71. The VDD is applied from the control unit 6 to the conductive layer 22 of the recording medium 20 mounted on the rotating disk according to need.

The processing circuit 5 is provided with the RF amplifier 50, the digital signal processing unit 51, the D/A converter 52, etc., performs the control of injection of electrons by the electron gun of the pick-up 4-4, and reproduces the information of the recording medium 20 based on the output voltage Vout from the counter electrodes 45-1 via the output voltage generating circuit.

An explanation will be made next of the writing operation in such an information recording and reproducing apparatus. When the recording medium 20 is mounted on the rotating disk 70 in the apparatus, the vacuum pump 2 operates to evacuate the interior of the container A. Then, the voltage VDD is applied to the conductive layer 22 of the recording medium 20. By this, full erasure of the recording as shown in FIG. 18A is carried out.

Next, the processing circuit 5 operates and the rotating disk 70 rotates. At the same time, the pick-up 4-4 moves to a predetermined position of the recording medium 20. Next, the pick-up 4-4 moves in the radial direction of the recording medium 20, scans the fixed electrodes 24 along the track, and implants electrons into the predetermined fixed electrodes 24 from the electron gun 40 under the control of the processing circuit 5. After the writing is ended, the interior of the container A is returned to the atmospheric pressure state under the control of the control unit 6, where the recording medium 20 can be taken out of the information processing apparatus.

Further, in the reading operation, the recording medium 20 on which the information is recorded is mounted on the rotating disk 70, then the processing circuit 5 operates and the rotating disk 70 rotates. At the same time, the pick-up 4-4 moves to a predetermined position of the recording medium 20. Then, the written information is read out as shown in FIG. 19 to FIG. 21 in a state where the pick-up 4-4 moves in the radial direction of the recording medium 20 and the counter electrode 45-1 scans the fixed electrode 24.

In this way, the present information recording and reproducing apparatus is structured so that the writing, erasing, and reading of the information of the recording medium 20 can be carried out by a single apparatus. Of course, it is also possible to separately configure the information recording apparatus performing the writing and erasing of the information and the information reproducing apparatus performing the reading of the information.

Figure 23:
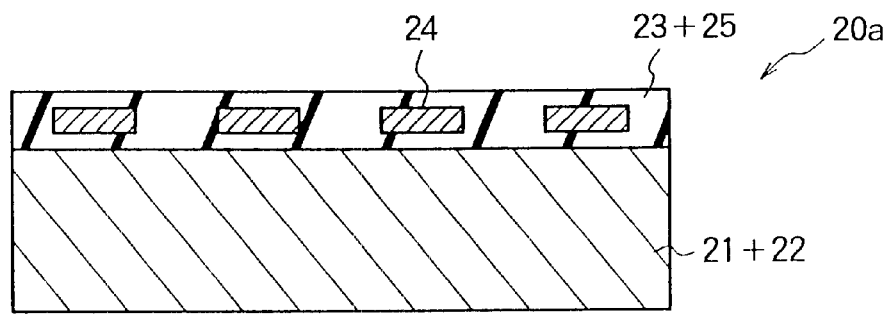
FIG. 23 is a sectional view of a modification of the recording medium of the fourth aspect of the invention.

Next, an explanation will be made of a modification of the recording medium and the information reproducing apparatus. FIG. 23 shows a recording medium 20a structured using both of the substrate 21 and the conductive layer 22 in which the substrate 21 is constituted by a conductive material, for example, aluminum and the conductive layer 22 of the recording medium 20 shown in FIG. 14 is omitted. By this, the structure is simplified, and the reduction of costs becomes possible.

Figure 24A:
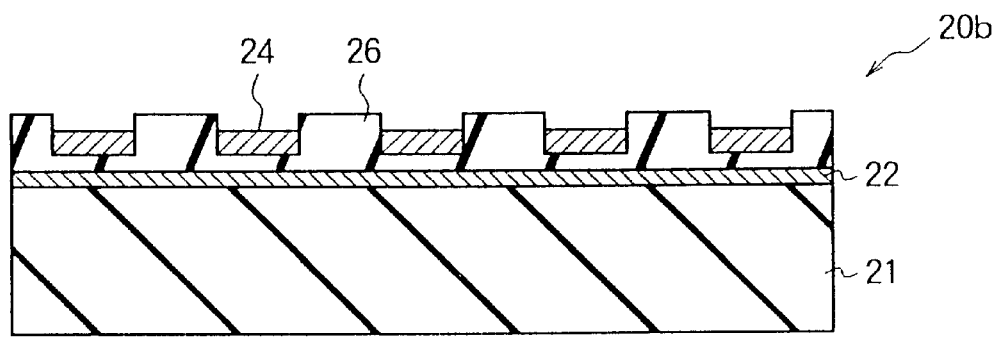
FIG. 24A is a sectional view of another modification of the recording medium of the fourth aspect of the invention.
Figure 24B:
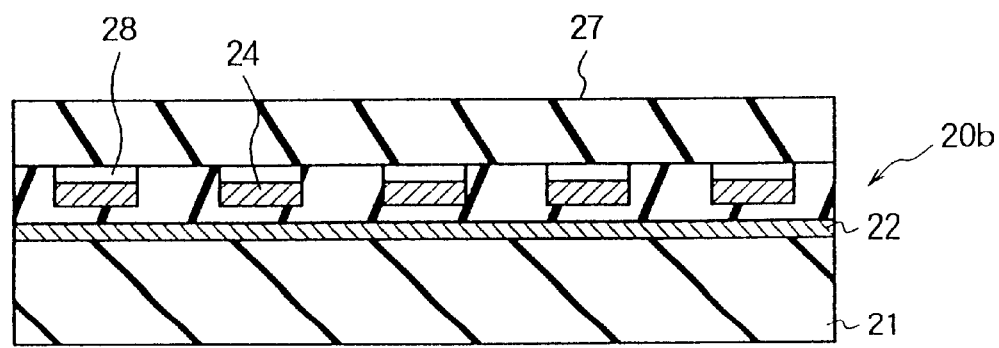
FIG. 24B is a sectional view of the state where a protective plate is covered.

Further, FIG. 24A shows a recording medium 20b structured in which an insulating layer 26 is further provided at the conductive layer 22 laminated on the substrate 21 and fixed electrodes 24 are embedded in the recesses formed in this insulating layer 26 so as to be just slightly recessed from the surface of the insulating layer 26. In this structure, the surfaces of the fixed electrodes 24 are exposed, therefore the electrons injected into the fixed electrodes 24 are liable to be discharged from the. exposed surfaces of the fixed electrodes 24 along with the elapse of time. For this reason, it is necessary to insulate the exposed surfaces of the fixed electrodes 24 in a vacuum state. For this reason, the protective plate 27 becomes necessary, and it is necessary to cover the protective plate 27 on the recording medium 20b in vacuum by using the apparatus as shown in FIG. 1, and as shown in FIG. 24B, draw the protective plate 27 to the recording medium 20b at atmospheric pressure by utilizing the vacuum of the gaps 28 between the fixed electrodes 24 and the protective plate 27, bring the exposed surface of the fixed electrodes 24 into contact with vacuum, and insulate the fixed electrodes 24 from the periphery. When performing the writing and reproduction, they are carried out by peeling the protective plate 27 in vacuum by using the apparatus as shown in FIG. 1. Accordingly, when it is stored in vacuum, such a protective plate 27 is not necessary.

Figure 25:
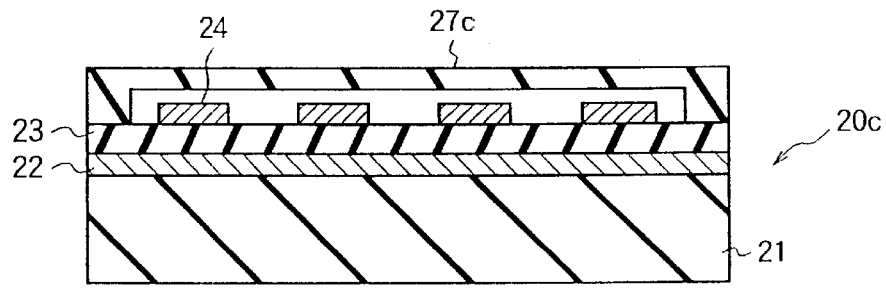
FIG. 25 is a sectional view of still another modification of the recording medium of the fourth aspect of the invention.

The recording medium 20c shown in FIG. 25 has a structure wherein the fixed electrode 24 is tightly adhered in the form of block onto the conductive layer 22 on the substrate 21 and the insulating layer 23 laminated on the conductive layer 22 along the track. As the storage method of the recording medium 21c of this structure, the fixed electrode 24 must be stored in vacuum, and therefore, as shown in the same figure, at the storage, the protective plate 27c coated in vacuum is absorbed by the recording medium 20c.

Figure 26:
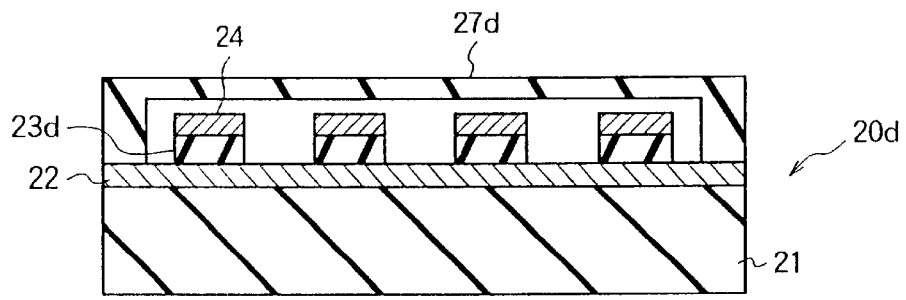
FIG. 26 is a sectional view of another modification of the recording medium of the present invention.

Further, the recording medium 20d shown in FIG. 26 is structured with the fixed electrodes 24 and the insulating layer 23d beneath them arranged along the track on the conductive layer 22 as laminates of the same shape. The advantage of this structure is that electrons which are not injected into the fixed electrodes 24 are directly fetched into the conductive layer 22 when injecting electrons into the fixed electrodes 24 by the electron gun 40, so the charging of electrons of the insulating layer 23a can be prevented. as much as possible. The rest of the structure is the same as that of the recording medium 21c shown in FIG. 25, for example, the protective plate 27d is required for storing this in vacuum at the time of storage.

In full erasure of the recording media 20c and 20d, since the fixed electrodes 24 project from the surface of the recording media 21c and 21d, by bringing for example the metal plate into close contact with the fixed electrodes 24, the fixed electrodes 24 can be instantaneously charged to the voltage (V0) of that metal plate. In this case, it is sufficient if the metal plate is merely contacted, therefore there is little apprehension of breakage of the fixed electrodes 24. The injection of electrons and writing can be carried out similar to the above description.

Further, in a structure in which fixed electrodes 24 project from the surface of the recording medium such as the recording media 21c and 21d, breakage reading is possible. Namely, the information can be stored by a procedure of bringing the counter electrodes 45-1 into contact with the fixed electrodes 24, causing the electrons of the fixed electrodes 24 to be directly attracted to the counter electrodes 45-1, and, at this time, sequentially writing the detected information of "1" or "0" again.

Figure 27:
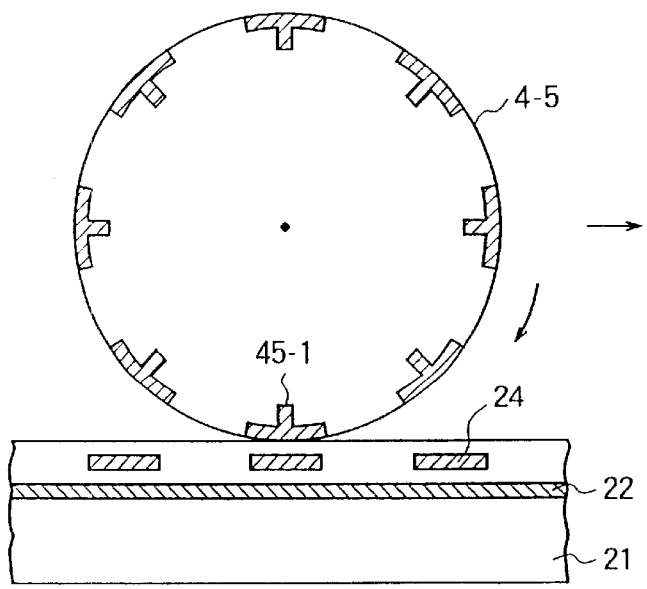
FIG. 27 is a sectional view of the modification of the pick-up for reproduction.
Figure 28:
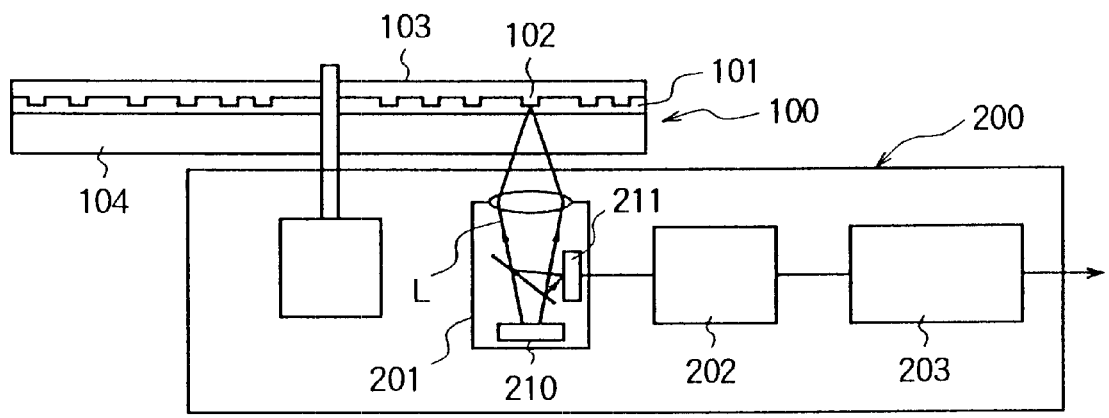
FIG. 28 is a block diagram of the recording apparatus according to a conventional example and the information reproducing apparatus thereof.
Figure 29:
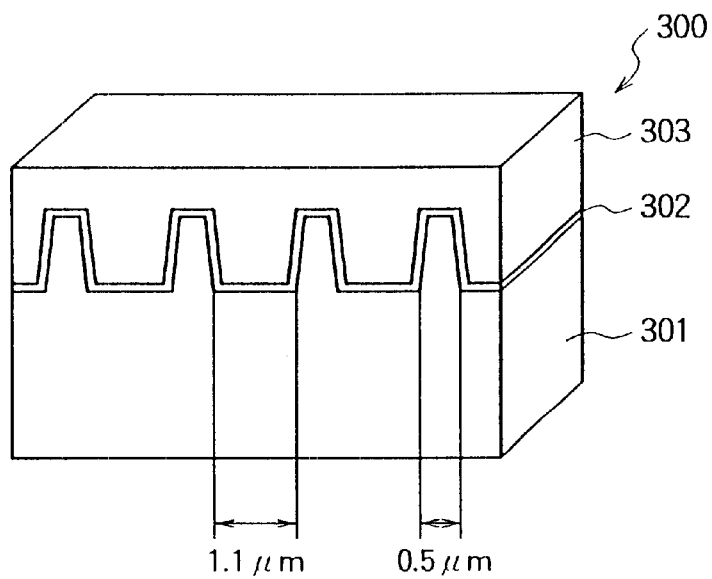
FIG. 29 is a sectional view of the sectional structure of a so-called "Mini Disc".

FIG. 27 shows a modification of the pick-up for reproduction and uses a pick-up 4-5 structured with a plurality of counter electrodes embedded in a wheel having substantially the same width as the width of the track of the recording medium at the same pitch as the pitch of the fixed electrodes. At the time of reproduction, this pick-up rolls and scans along the track, and the counter electrodes 45-1 and the fixed electrodes 24 are made to correctly face each other. In this case, it is possible to form a rail-like member between the tracks by for example tungsten on the surface of the recording medium to enable correct rolling of the wheel-like pick-up in the track like a trolley.

As explained in detail above, according to the recording medium according to the first aspect of the invention, a signal layer made of metal is used and pits are easily formed by pressing etc., therefore there is an effect that a reduction of the number of fabrication steps and the manufacturing costs can be achieved.

Further, if the information of the recording medium is read by firing an electron beam to a predetermined position of the signal layer and detecting the reflected electron beam, high precision reading becomes possible and, as a result, the pit length can be remarkably shortened in comparison with the pit length of the conventional recording medium and a recording medium of large capacity suitable for multimedia data can be provided.

Further, if a protective plate is provided covering the signal layer, dust or the like will not enter into the pits etc. at the time of storage, therefore occurrence of breakage of the signal layer and generation of reading error can be completely prevented. Further, if the signal layer is formed by a metal conductor such as flexible aluminum, the pits of the signal layer can be formed further easily and with a higher precision, therefore a further reduction of the number of the working steps and manufacturing costs can be achieved.

According to the information reproducing apparatus according to the second aspect of the invention, a structure of detecting the existence of pits by the electron beam emitted from the electron gun to the signal layer is adopted, therefore, in comparison with the laser beam L used in CD of FIG. 14, a detection precision higher by two or more orders can be obtained. As a result, in comparison with the conventional CD and DVD, there is an effect that a large capacity recording medium on which an order or more larger amount of information is recorded can be read and reproduced with a high precision. Further, since it has a simple structure comprising the electron gun and detecting circuit, a reduction of the number of the fabrication steps and manufacturing costs can be achieved.

According to the information reproducing apparatus according to the third aspect of the invention, there is adopted a structure with which the discharge and the change of capacity between the signal layer of the recording medium and the metal body is detected by the metal body and the detecting circuit and the existence of pits can be read. Accordingly, the hardware structure can be further simplified. As a result, there also exists an effect that a further reduction of the number of the fabrication steps and manufacturing costs can be achieved.

According to the recording medium of the fourth aspect of the invention, electrons are used as the sensing medium, therefore a much larger volume of recording information than that of a recording medium using light as a medium can be written and read.

According to the information recording apparatus according to the fifth aspect of the invention, the writing and full erasure of such a large capacity recording medium can be easily carried out.

According to the information reproducing apparatus of the sixth aspect of the invention, the reading of such a large capacity recording medium can be reliably carried out.

According to the information recording and reproducing apparatus of the seventh aspect of the invention, both of the information recording apparatus and the information reproducing apparatus are provided, therefore the writing and reading of a large capacity recording medium can be carried out by a single apparatus.

INDUSTRIAL APPLICABILITY

The recording medium of the present invention is utilized in the same way as a CD or other ROM using light or a magneto-optic disk or other RAM. Since it uses electrons as the sensing medium, it can record a much larger amount of information than them.

The information reproducing apparatus of the present invention can read the information recorded on such a larger capacity recording medium using electrons.

The information recording apparatus of the present invention can record information by injecting electrons into such a recording medium by an electron gun.

The information recording and reproducing apparatus of the present invention is provided with both of such an information recording apparatus and information reproducing apparatus and can perform the recording and reproduction by a single apparatus.

What is claimed is:

1. An information reproducing apparatus, comprising:

an electron gun apparatus having an electron gun which can fire an electron beam at a predetermined position of a recording medium having a signal layer made of metal in which pits are formed to be reflected from the surface of said signal layer, a voltage supply apparatus which applies a predetermined voltage to said signal layer of said recording medium when reproducing data of said recording medium, a detector which can detect an intensity of said electron beam reflected from the signal layer of said recording medium, and a reproducing circuit which reproduces the information of said recording medium based on the result of detection of said detector.

* * * * *